United States Patent
Enomoto

(10) Patent No.: US 7,304,761 B2
(45) Date of Patent: Dec. 4, 2007

(54) DATA RETRIEVAL METHOD

(75) Inventor: Jun Enomoto, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 831 days.

(21) Appl. No.: 10/350,320

(22) Filed: Jan. 24, 2003

(65) Prior Publication Data
US 2003/0151776 A1    Aug. 14, 2003

(30) Foreign Application Priority Data
Jan. 24, 2002    (JP)    ............... 2002-015455

(51) Int. Cl.
G06F 15/00    (2006.01)
G06K 9/36    (2006.01)
(52) U.S. Cl. .................... 358/1.15; 358/1.16
(58) Field of Classification Search ............. 358/1.1, 358/1.9, 1.13, 1.15, 1.16, 474, 448
See application file for complete search history.

(56) References Cited

U.S. PATENT DOCUMENTS 6,219,129 B1 * 4/2001 Kinjo et al. ............... 355/40
6,834,130 B1 * 12/2004 Niikawa et al. ........... 382/305
7,043,047 B1 * 5/2006 Masaki ...................... 382/100

FOREIGN PATENT DOCUMENTS

| JP | 9-55834 | 2/1997 |
| JP | 9-179211 | 7/1997 |
| JP | 2000-222437 | 8/2000 |
| JP | 2001-7965 | 1/2001 |

* cited by examiner

Primary Examiner—Gabriel I. Garcia
(74) Attorney, Agent, or Firm—Sughrue Mion Pllc.

(57) ABSTRACT

The data retrieval method causes image processing information used to perform an image processing operation on an image and data for retrieval used for specifying the image to correspond to each other so as to register them in advance in a database as image processing-related data, with the image processing-related data being registered every time one of a plurality of image processing operations is performed on the image, performs retrieval within the database using the data for retrieval when reprocessing is to be performed on the image and specifies as candidate data for performing reprocessing on the image, image processing-related data registered most lately among image processing-related data that concern a plurality of image processing operations performed on the image and have been registered in the database.

12 Claims, 5 Drawing Sheets

DATA RETRIEVAL METHOD

BACKGROUND OF THE INVENTION

1. Field of the Invention

The present invention relates to a technical field of a print system for outputting a print (photograph) on which an image photographed on a film [or an image photographed by a digital camera] is reproduced, and in particular, to a data retrieval method allowing an image on a print made on the occasion of film processing and that on a reprint to suitably match each other in such a print system.

2. Description of the Related Art

Up to now, so-called direct exposure for projecting an image on a film onto a photosensitive material (photographic paper) and then performing exposure on the photosensitive material has been a main technique in printing of an image photographed on a photographic film (hereinafter, referred to simply as a film) such as a negative film or a reversal film onto a photosensitive material.

On the other hand, a printer utilizing digital exposure, that is, a digital photographic printer has recently been put into practical use. In the digital photographic printer, an image recorded on a film is photoelectrically read. The read image is converted to a digital signal, which is then subjected to various image processing operations so as to obtain image data for recording. A photosensitive material is subjected to scanning exposure with recording light which has been modulated in accordance with the obtained image data so as to record an image (latent image), thereby obtaining a (finished) print.

The digital photographic printer basically includes: a scanner (image reader) for making reading light incident on a film and reading its projected light so as to photoelectrically read an image recorded on the film; an image processor for performing predetermined processing on image data read by the scanner [or image data supplied from a digital camera] or the like so as to obtain image data for image recording, that is, an exposure condition; a printer (image recorder) for performing scanning exposure on a photosensitive material, for example, by light beam scanning in accordance with the image data output from the image processor so as to record a latent image; and a processor (developing unit) for performing development processing on the photosensitive material exposed by the printer so as to obtain a (finished) print on which the image is reproduced.

In such a digital photographic printer, images can be processed as digital image data to adjust images, so various operations including the correction of washed-out highlights and flat (dull) shadows due to the taking of pictures with rear light or an electronic flash, sharpening, and the like can be performed in an effective manner to produce prints of the high quality that has been unattainable by the conventional direct exposure.

[Moreover, according to the digital photographic printer, even an image photographed by a digital camera or the like can be output as a print.]

Not only in such a digital photographic printer but also an analog photographic printer utilizing direct exposure, for a print output from an image photographed on a film [or image data photographed by a digital camera], so-called reprinting (reprocessing) for reoutputting an image (frame) which has already been printed once as a print is often performed in accordance with the request of a reprint and the like.

In this case, unless a modification is otherwise indicated, it is required that the image reproduced on a previously outputted print (normally, a print made on the occasion of film processing for reproducing and outputting an image photographed on a photographic film) and the image on a reprint match each other.

However, due to differences in decisions or operations by operators, the previous print and the reprint have often different image colors and densities, leading to many customer complaints.

In order to cope with this problem, for example, a print system allowing a reorder to be placed without dealing with a film has been proposed in JP 09-55834 A or JP 09-179211 A.

In addition, a printing system for efficiently performing the retrieval of image processing information is disclosed in, for example, JP 2000-222437 A and JP 2001-7965 A.

In these prior art documents, image processing is performed during reprinting under the same image processing condition as that of the image processing performed during printing with film processing so as to obtain the identical images in the reprint and the print made on the occasion of film processing. For this purpose, the image processing conditions in the printing with film processing are recorded in a database along with the image data on images to be processed, so that the retrieval within the database is performed during the reprinting so as to fetch out the image processing conditions in the printing with film processing.

Conventionally, when an order for a reprint is placed, the retrieval is performed within the image database for an image characteristic quantity so as to compare the image characteristic quantity of the image data at reorder with that in the printing with film processing. The image data in the printing with film processing that has the highest (greatest) matching rate of the image characteristic quantity (image matching rate) is specified as image data (candidate image data) in the printing of that data with film processing, so that the image processing condition of that image data is also used for the image data at reorder.

For example, as shown in FIG. 5, image data in the printing with film processing is registered as image data 1, image data 2, . . . , and image data N within an image database 90. These image data are registered in the image database 90 in the order of the image data 1, the image data 2, and so on; that is, the image data 1 is the earliest registered, and the image data N is the latest registered image data.

It is assumed that, as a result of comparing the image data 92 at reorder and the image data 1, 2, . . . , and N in the printing with film processing using their image characteristic quantities, matching rates between the image data 92 at reorder and the image data 1, the image data 2, . . . , and the image data N are X1, X2, . . . , and XN, respectively, and the relationship between the matching rates is: X1>X2> . . . >XN.

In a conventional method, the image data 1, which is the earliest registered but has the highest image matching rate X1, is used as candidate image data.

In the laboratory, the same frame or the same image is sometimes printed by remaking its print for several times while, for example, changing the density or tone (gradation) of the respective colors of YMC, giving the sepia tone to a print, or the like. Therefore, in some cases, the same image is subjected to the printing with film processing for a plurality of times, and correspondingly, a plurality of image processing conditions are registered for the image. In other cases, a print is made at reorder while modifying the image processing condition in the printing with film processing in accordance with requests of a customer or the like. The modified image processing condition is registered independently of the image processing condition in the printing with film processing.

In such a case, a customer often orders a reprint which is to be made by performing the same image processing as performed in the printing based on the image data on the latest registered image, namely, the same image processing as performed under the latest registered image processing condition.

Even in such a case, according to a conventional image retrieval method as described above, however, since the image data having the highest image matching rate is always specified as candidate image data regardless of the order of registration, there is a possibility that a finished reprint may be different from that the customer had requested.

SUMMARY OF THE INVENTION

In view of the above problems, the present invention has an object of providing a data retrieval method enabling the retrieval of image processing-related data suitable for producing a reprint meeting the requests of a customer even in the case where data (image processing-related data) related to a plurality of image processing operations are registered in a database for the same image.

In order to attain the object described above, the first aspect of the present invention provides a data retrieval method for retrieving data necessary for image processing from a database, comprising: causing image processing information used to perform an image processing operation on an image and data for retrieval used for specifying the image to correspond to each other so as to register them in advance in the database as image processing-related data concerning the image processing operation performed on the image, with the image processing-related data being registered every time one of a plurality of image processing operations is performed on the image; performing retrieval within the database using the data for retrieval for the image when reprocessing is to be performed on the image; and specifying as candidate data for performing reprocessing on the image, image processing-related data registered most lately among image processing-related data that concern a plurality of image processing operations performed on the image and have been registered in the database.

In order to attain the object described above, the second aspect of the present invention provides a data retrieval method for retrieving data necessary for image processing from a database, comprising: causing image processing information used to perform an image processing operation on an image and data for retrieval used for specifying the image to correspond to each other so as to register them in advance in the database as image processing-related data concerning the image processing operation performed on the image, with the image processing-related data being registered every time one of a plurality of image processing operations is performed on the image; performing retrieval within the database using the data for retrieval for the image when reprocessing is to be performed on the image; and specifying as candidate data for performing reprocessing on the image, image processing-related data registered most lately among image processing-related data that concern a plurality of image processing operations performed on the image and have been registered in the database, with each of the image processing-related data having such a matching rate with the data for retrieval that its value is within a predetermined range from a maximum value to a given value.

It is preferable in the first and second aspects that at least one selected from among image information on the image subjected to image processing, image data on the image, and compressed image data on the image is additionally caused to correspond to the image processing information or the data for retrieval and recorded in the database.

Preferably, at least one selected from among an image characteristic quantity of the image, image information on the image subjected to image processing, and compressed image data on the image is used as the data for retrieval.

Preferably, an image characteristic quantity of the image is used as the data for retrieval.

Preferably, the image is photoelectrically read from an image photographed on a film.

Preferably, the plurality of image processing operations are performed during printing with film processing.

DESCRIPTION OF THE PREFERRED EMBODIMENTS

Hereinafter, a data retrieval method of the present invention will be described in detail, based on preferred embodiments illustrated in the accompanying drawings.

Figure 1:
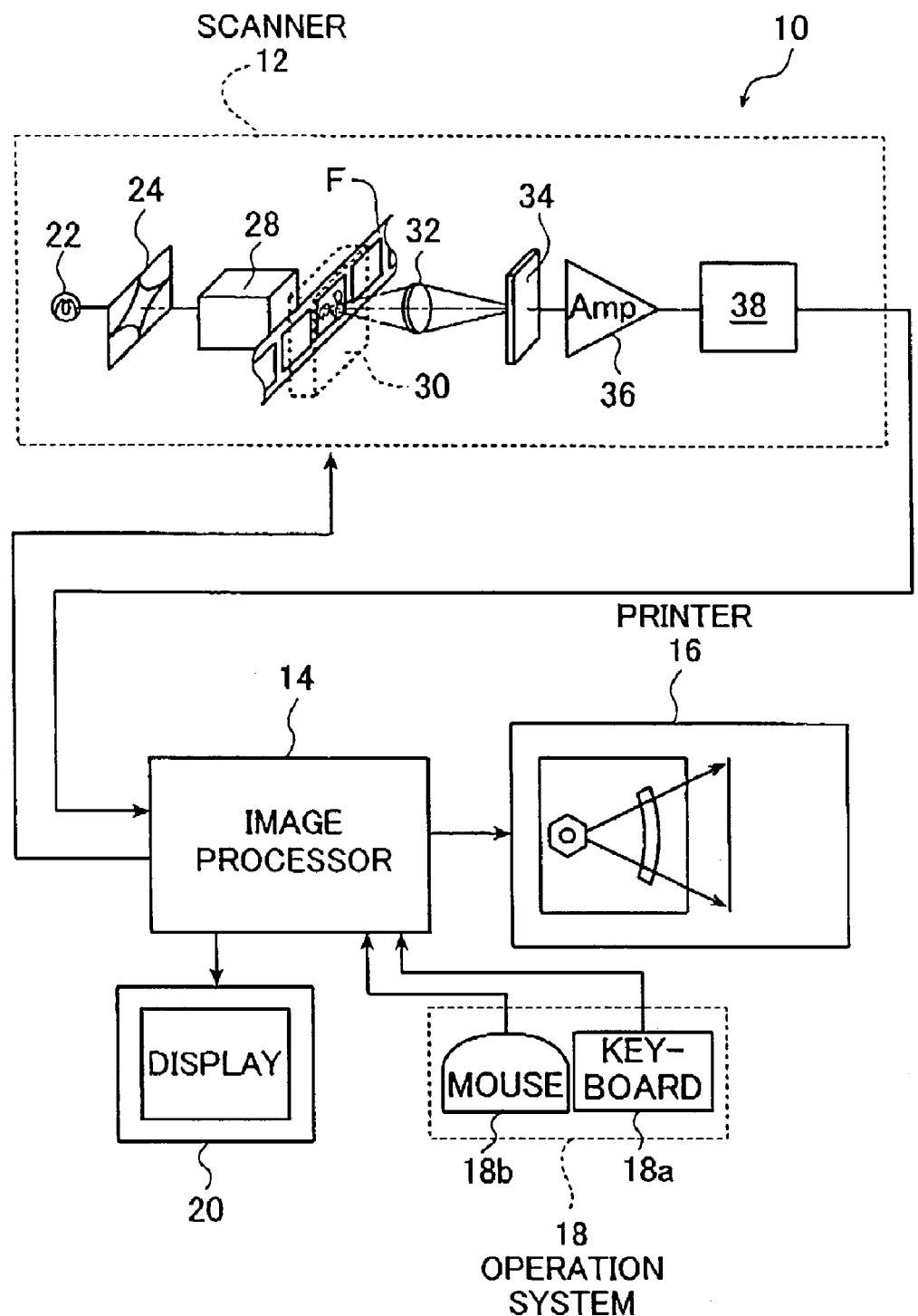
FIG. 1 is a block diagram showing a schematic configuration of a digital photographic printer including an image processor for executing a data retrieval method according to the present invention.

FIG. 1 is a block diagram showing a schematic configuration of a digital photographic printer including an image processor for executing a data retrieval method according to the present invention.

A device configuration for executing the data retrieval method of the present invention is not limited to such a digital photographic printer; it may alternatively be a conventional analog photographic printer employing direct exposure for printing an image on photographic paper with projected light from a film.

A digital photographic printer 10 (hereinafter, referred to simply as a photo printer 10) shown in FIG. 1 basically includes: a scanner (image reader) 12 for photoelectrically reading an image photographed on a film F; an image processor 14 for processing the read image data to obtain image data for output as well as for performing the operation, the control and the like of the entire photo printer 10; and a printer 16 for exposing a photosensitive material (photographic paper) with a light beam modulated in accordance with the image data output from the image processor 14 and for performing development processing so as to output it as a (finished) print.

An operation system 18 including a keyboard 18a and a mouse 18b for inputting or setting various conditions, selecting and instructing a specific processing operation, and inputting an instruction for color/density correction or the like, and a display 20 for displaying an image read by the scanner 12, various operational instructions, a screen for setting/registering conditions and the like are connected to the image processor 14.

A set value for setting the range for narrowing candidate data in data retrieval is input through the operation system 18 by an operator. The setting thereof will be described below in detail.

The scanner 12 photoelectrically reads an image photographed on the film F and the like. The scanner 12 includes a light source 22, a variable diaphragm 24, a diffusion box 28 for uniformizing reading light made incident on the film F in a plane direction of the film F, an imaging lens unit 32, an image sensor 34 having line CCD sensors corresponding to the reading of the respective R (red), G (green), and B (blue) images, an amplifier 36, and an A/D (analog/digital) converter 38.

A dedicated carrier 30, which is removably attached to a main body of the scanner 12, is prepared in the photo printer 10 in accordance with the kind or the size of a film such as an Advanced Photo System (hereinafter, referred to simply as APS) or a 135-size negative (or reversal) film, the form of a film such as a strip or a slide, and the like. By replacing the carrier 30 with another, various kinds of processing operations can be performed using various kinds of films. An image (frame) photographed on the film F and provided for print production is conveyed to a predetermined reading position by the carrier 30.

In such a scanner 12, upon reading the image photographed on the film F, reading light emitted from the light source 22, whose light amount is adjusted by the variable diaphragm 24, is made incident on the film F placed at a predetermined reading position by the carrier 30 so as to be transmitted therethrough. As a result, the projected light bearing the image photographed on the film F is obtained.

The carrier 30 includes a pair of carrier rollers for conveying the film F to a predetermined reading position and a mask having a slit for regulating projected light from the film F to a predetermined slit-like form in the same direction (main scanning direction) as the line CCD sensors extend. The carrier 30 places the film F at a predetermined reading position. The reading light is made incident on the film F while the film F is being conveyed so that a longitudinal direction of the film F conforms with an auxiliary scanning direction perpendicularly crossing a main scanning direction. As a result, the film F goes through two-dimensional slit scanning with the reading light by the slit formed in the main scanning direction and an image of each frame photographed on the film F is thus read.

A magnetic recording medium is formed on the APS film. A magnetic head for recording/reading information on/from the magnetic recording medium is placed on the carrier 30 compatible with the APS film (cartridge). The information recorded on the magnetic recording medium of the film F is read by this magnetic head so as to be sent to the image processor 14 and the like. In addition, information from the image processor 14 and the like is transferred to the carrier 30 so as to be recorded on the magnetic recording medium of the film F by the magnetic head.

On the carrier 30, there is arranged a code reader for reading barcodes such as a DX code, an extension DX code and an FNS code, which are optically recorded on the film F, or various kinds of information optically recorded on the film F. Various kinds of information read by this code reader is sent to the image processor 14.

As described above, the reading light transmits through the film F held by the carrier 30 so as to be projected light bearing the image. The projected light forms an image on a light-receiving surface of the image sensor 34 by the imaging lens unit 32.

The image sensor 34 is a so-called three-line color CCD sensor for respectively reading an R image, a G image and a B image, each sensor extending in the main scanning direction. The projected light from the film F is decomposed into three primary colors R, G and B by the image sensor 34 so as to be photoelectrically read.

An output signal of the image sensor 34 is amplified in the amplifier 36, and is converted into a digital signal by the A/D converter 38 so as to be sent to the image processor 14.

In the scanner 12, the image reading is performed twice so as to read the image photographed on the film F, i.e., prescan for reading the image at a low resolution and fine scan for obtaining image data of an output image.

Prescan is performed under preset prescan reading conditions that ensure that the images on all films to be handled by the scanner 12 can be read without saturating the image sensor 34. Fine scan uses the prescanned data and is performed under fine scan reading conditions that are set for each frame such that the image sensor 34 is saturated at a slightly lower density than the minimum density of the image (frame) of interest. Therefore, the output signals for prescan and fine scan are different from each other only in resolution and output level.

In the present invention, the scanner 12 is not limited to a scanner for performing such slit scanning. The scanner 12 may also be a scanner for performing plane exposure to read the entire surface of an image of one frame at a time. In such a case, for example, an area CCD sensor is utilized, and color filters of R, G and B are sequentially inserted between the light source and the film F. Then, an image is read by the area CCD sensor so as to decompose the image photographed on the film F into three primary colors for sequential reading.

As described above, an output signal (image data) from the scanner 12 is output to the image processor 14.

In the photo printer 10, the image processor 14 may receive, in addition to the images of the film F read by the scanner 12, image data from various image data supply sources including image reading means such as an image reader for reading an image on a reflection copy, image pick-up means such as an image pick-up device such as a digital camera or a digital video camera, communication means such as a LAN (Local Area Network) or a computer communication network, image data recording means such as media (recording mediums), for example, a memory card, an MO (magneto-optical recording medium) and a photo CD, and the like so as to perform processing operations as described below.

Figure 2:
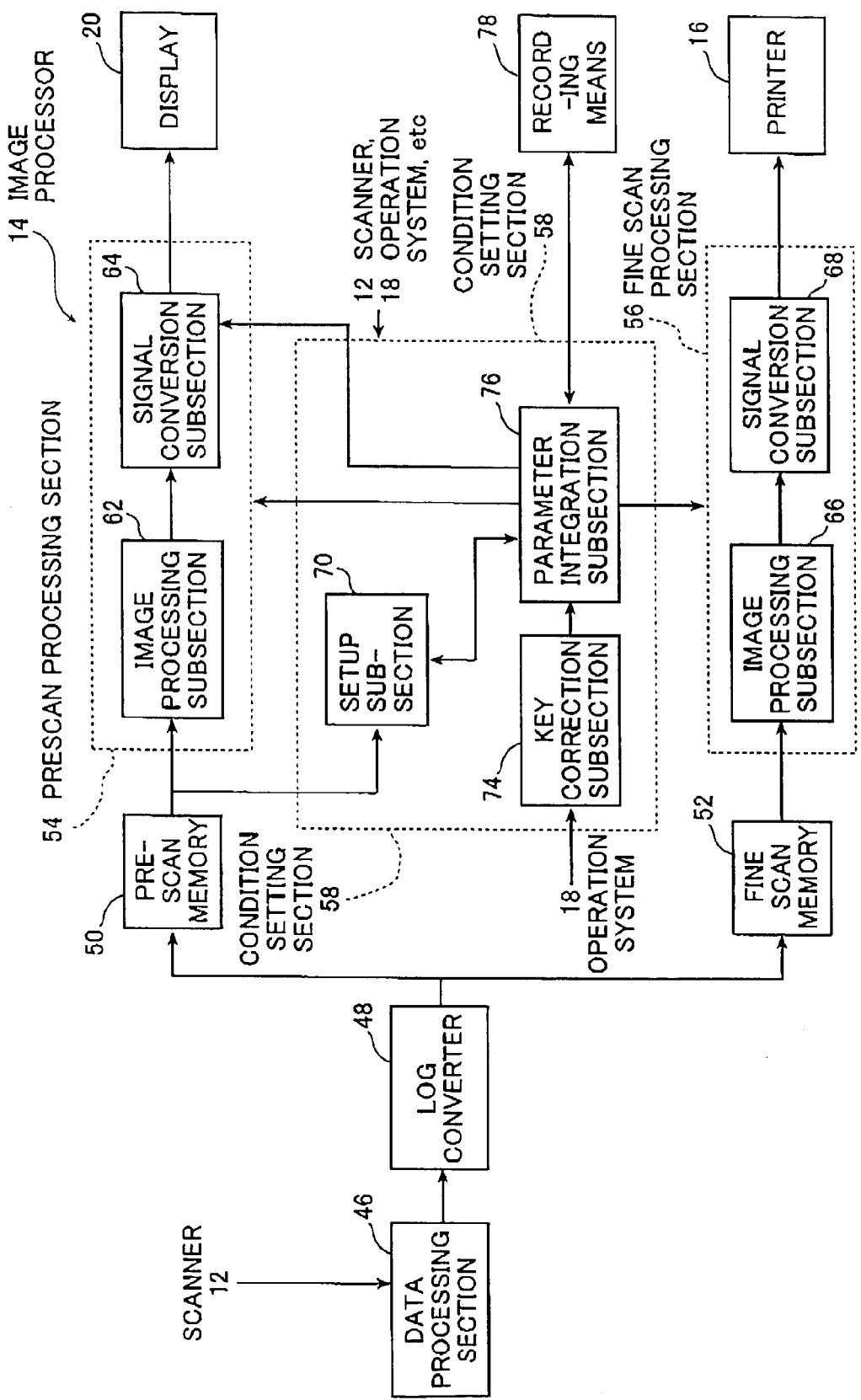
FIG. 2 is a block diagram showing a schematic configuration of the image processor.

FIG. 2 is a block diagram showing a schematic configuration of the image processor 14.

In the present invention, the image processing information used previously when, for example, an image was processed during printing with film processing and the data for retrieval are caused to correspond to each other and then registered in a database as image processing-related data, and additionally as required, at least one selected from among the image information on the processed image, the image data on the image and the compressed image data on the image, as being caused in advance to correspond to the above image processing information or data for retrieval, is registered in a database as image processing-related data. When reprocessing is to be performed, the image processing information and additionally as required, image information, image data, compressed image data, and so forth are retrieved and read from the database using the data for retrieval so that the reprocessing is performed using the image processing information and the like to obtain the same image as the previous one.

The image processing information as above is that for reproducing the same image processing in the reprinting of an image as that in the printing of the image with film processing and is principally an image processing condition, including set values of various parameters used for the image processing. The image processing information may include the type of image processing performed, the order of the image processing operations, or again, certain related data as an image processing condition.

The data for retrieval is such data as an image characteristic quantity, which is caused to correspond to the image processing information and then recorded in the database and used for the data retrieval within the database in order to specify the image of interest. It is also possible to use the compressed image data or the image data before or after, preferably before, image processing as the data for retrieval. In that case, however, the retrieval requires more time, although rendered more accurate, because of the increased amount of data used for retrieval. Consequently, data consisting solely of numeric values such as an image characteristic quantity is preferred.

The compressed image data is used for representing the result of data retrieval on a display in order to confirm whether or not the correct image data is read out by the retrieval. The compressed image data for such a use may be that obtained before or after image processing, the compressed image data after image processing being more preferred.

The image information is formal information of the image of interest such as the frame number (No.) of the image and the date and time (day, month, year, and time of day) of photographing also used as the data for retrieval or an auxiliary data thereof. Examples of the image information further include FID (film identification code), film type, camera model, customer ID, image-specific ID, date (day, month, and year) of receiving order, ID of a laboratory where an order was received, machine ID, order, film format (ASP, 135-size, Brownie-size, etc.), type of film carrier, film mask, image format (BMP, JPEG, etc.), and ordering terminal ID, all of which are also used as the data for retrieval or an auxiliary data thereof.

In this embodiment, image processing condition for each image processed in the printing with film processing and data for retrieval such as the image characteristic quantity extracted from the image of interest for retrieving the image processing condition, and additionally as required, image data before or after image processing, compressed image data obtained by compressing such image data, image information, or the like are recorded (registered) in a database as information necessary for image processing in the reprocessing, namely image processing-related data. Hereinafter, these kinds of information necessary for the image processing in the reprocessing are sometimes generically called image processing information and the like.

In the case where a reprint is designated, a film is scanned so that a designated image is input. At the same time, the image characteristic quantity is extracted from the designated image so as to be used as data for retrieval corresponding to that image. The data for retrieval is used for retrieval within a database. The designated image input from the film is subjected to image processing under the same image processing condition as the retrieved image processing condition in the printing with film processing so as to produce a reprint.

A data retrieval method according to the present invention will be described below in detail.

As shown in FIG. 2, the image processor 14 includes a data processing section 46, a Log converter 48, a prescan (frame) memory 50, a fine scan (frame) memory 52, a prescan processing section 54, a fine scan processing section 56 and a condition setting section 58.

FIG. 2 mainly shows the sections related to image processing. Besides the above-described sections, the image processor 14 includes a CPU for controlling and managing the entire photo printer 10 including the image processor 14, a memory for storing information necessary for the operation of the photo printer 10 or the like, means for determining a F-number of the variable diaphragm 24 or an accumulation time of the image sensor 34 and the like. The operation system 18 and the display 20 are connected to each section via the CPU (CPU bus) and the like.

Each of output signals of R, G, and B output from the scanner 12 is subjected to predetermined data processing operations such as DC offset correction, dark current correction, and shading correction in the data processing section 46. The processed signal is converted by the Log converter 48 to digital image data so that prescan (image) data is stored in the prescan memory 50 while the fine scan (image) data is stored in the fine scan memory 52.

The prescan data stored in the prescan memory 50 is processed in the prescan processing section 54 so as to be converted into image data corresponding to display by the display 20 whereas the fine scan data stored in the fine scan memory 52 is processed in the fine scan processing section 56 so as to be converted into image data corresponding to an output by the printer 16.

The prescan processing section 54 includes an image processing subsection 62 and a signal conversion subsection 64, whereas the fine scan processing section 56 includes an image processing subsection 66 and a signal conversion subsection 68.

The image processing subsection 62 of the prescan processing section 54 and the image processing subsection 66 of the fine scan processing section 56 are both the sections for performing image processing on the image (image data) read by the scanner 12 in accordance with the setting in the condition setting section 58 described below. The image processing subsection 62 and the image processing subsection 66 basically perform the same processing except for a difference in pixel density of image data to be processed.

Image processing in the image processing subsections 62 and 66 include various known image processing operations. As examples thereof, one or more processing operations selected from: gray balance adjustment, gradation adjustment, density adjustment (color density correction), electron magnification processing, sharpness (sharpening) processing, film grain compensation processing, dodging processing (providing dodging effects in a print system employing direct exposure by image data compression while maintaining a half tone), geometric distortion correction, marginal luminosity correction, red-eye correction, special finishing such as soft-focus or black and white finishing, and the like are given.

Each of these processing operations may be performed by a known method, utilizing a suitable combination of a processing computation (algorithm), processing through an adder or a subtracter, processing with a LUT (look-up table), a matrix (MTX) computation, processing with a filter, and the like.

The signal conversion subsection 64 of the prescan processing section 54 converts the image data processed through the image processing subsection 62 by use of a 3D-LUT (three-dimensional lookup table) and the like so as to convert it into image data corresponding to display by the display 20. On the other hand, the signal conversion subsection 68 of the fine scan processing section 56 converts the image data processed through the image processing subsection 66 by use of a 3D-LUT and the like so as to convert it into image data corresponding to image recording by the printer 16 and to supply this image data to the printer 16.

The processing conditions in these signal conversion subsections 64 and 68 are both set in the condition setting section 58.

The image processing operations performed in the prescan processing section 54 and the fine scan processing section 56 as well as processing conditions are set by the condition setting section 58.

The condition setting section 58 includes a setup subsection 70, a key correction subsection 74 and a parameter integration subsection 76. Recording means 78 for recording image processing-related data such as image processing information is connected to the parameter integration subsection 76. More specifically, the recording means 78 also serves as a database for recording image processing-related data such as image processing information. Information recorded in the database, namely image processing-related data, is information or data for reproducing in reprinting the processing of the same image (image data) as processed in the printing with film processing, and includes image processing information (principally image processing condition) for each image processed in the printing with film processing and data for retrieval for retrieving the image processing information (condition), and in some cases additionally, image data, compressed image data obtained by compressing the image data, image information, and the like. In reprinting, the parameter integration subsection 76 uses the data for retrieval to perform retrieval within the recording means 78 (database), thereby reading out the information in the printing with film processing (image processing-related data).

The image processing information may be any information as long as it enables the reproduction of the image processing, to be more specific, the type of image processing performed, the order of the image processing operations, the image processing condition encompassing conditions for various kinds of image processing, and so forth, in the printing with film processing. Particular examples of the image processing information include the type of image processing performed, the order of the image processing operations, as well as the image processing condition such as an LUT or an operational expression, which is produced for image processing, a coefficient related to a predetermined image processing, DCMY key correction information by an operator, and even certain related data.

The data for retrieval is the data caused to correspond to the image processing information (condition) with which an image was processed in the printing with film processing, that is recorded and used for data retrieval within the database in order to specify the image. Preferably, the data for retrieval is not image data itself, but consists solely of numeric values as is the case with an image characteristic quantity calculated from image data. Owing to this data for retrieval, an image is specified among, for example, hundreds of thousands of frames.

The compressed image data is used for displaying the result of data retrieval on the display 20 so as to confirm whether or not the correct image data is read out by the retrieval. Therefore, the compressed image data needs not have extremely high, image quality. Although it is apparent that the image data for displaying the result of data retrieval on the display 20 is not necessarily required to be compressed, it is desirable to compress the image data in view of a capacity of a hard disk and the like. Moreover, a compression method is not particularly limited; for example, JPEG, JPEG 2000, TIFF and the like are suitably given as some examples.

In the case where it is considered that the result of retrieval is not correct, candidate images for several frames may be displayed on the display 20 so that an operator can select a correct image therefrom. In such a case, it is more preferable that the candidate images are displayed in the order of a higher possibility (higher matching rate).

In the case where the result of retrieval is not displayed, it is not necessary to store the compressed image data. Therefore, a memory capacity can be reduced by the amount of the compressed image data. Correspondingly, a processing rate can be increased. In the case where the compressed image data is stored, it is efficient to fetch the data for retrieval out from the compressed image data as image characteristic quantity data. For example, as the image characteristic quantity serving as the data for retrieval, spatial degree data subjected to Discrete Cosine Transform (DCT) may be used. Alternatively, the image data may be blocked into blocks of a certain size so that a mean value of each block, the sum of the blocks, the maximum value, the minimum value or the like can be used.

It is usually during so-called printing with film processing for reproducing an image photographed on a photographic film and outputting the image as a photoprint when the photographic film is subjected to development processing (development, bleach-fix, wash and drying) that information about the image processing (image processing-related data such as image processing information) is recorded in the recording means 78 at the time of print production. Throughout the specification, such a procedure as above is defined as printing with film processing whereas other procedures of printing are all defined as reprinting. It is apparent that the image processing-related data such as image processing information may be recorded in the recording means 78 in the precedent reprinting so as to be used in the subsequent reprinting. More specifically, in this embodiment, the image processing-related data such as image processing information is recorded in the recording means 78 in the precedent printing such as the printing with film processing or the precedent reprinting so as to be used in the subsequent printing such as the reprinting and the subsequent reprinting. In the following description, in particular, the printing with film processing and the reprinting are described as representative examples.

The setup subsection 70 determines a reading condition for fine scan, the contents (type and order), the image processing condition, etc. of the image processing in the prescan processing section 54 and the fine scan processing section 56, the image characteristic quantity used as the data for retrieval, and so forth. More specifically, in the printing with film processing, from the prescan data, the setup subsection 70 produces a density histogram, calculates an image characteristic quantity such as a predetermined percentage point of frequency of a density histogram for a mean density, a highlight (minimum density) or a shadow (maximum density), LATD (Large Area Transmission Density), a maximum value density and a minimum value density of the histogram or the like so as to set the reading conditions for fine scan. Furthermore, the setup subsection 70 determines the image adjustment to be executed from various image processing operations and the order of execution in accordance with the density histogram, the image characteristic quantity, the instruction given by an operator and the like. Furthermore, the setup subsection 70 calculates respective image processing conditions and conversion conditions in the signal conversion subsection 68 and the like so as to supply them to the parameter integration subsection 76 together with the image characteristic quantity etc.

The key correction subsection 74 calculates the amount of adjustment for the image processing condition in accordance with instructions input through keys set on the keyboard 18a or through the mouse 18b of the operation system 18 for color adjustment, density adjustment, contrast (gradation) adjustment and the like so as to supply the calculated amount of adjustment to the parameter integration subsection 76.

The parameter integration subsection 76 receives the image processing condition and the like calculated by the setup subsection 70 so as to set them to predetermined sites of the prescan processing section 54 and the fine scan processing section 56. Furthermore, the parameter integration subsection 76 adjusts the image processing condition set to each site in accordance with the amount of adjustment and the like calculated by the key correction subsection 74.

In the printing with film processing, the parameter integration subsection 76 transmits the image processing information of the frame of interest and the calculated image characteristic quantity and the like received from the setup subsection 70 to the recording means 78 after processing for the frame is determined. On the other hand, in the reprinting, the parameter integration subsection 76 performs retrieval within the recording means 78 so as to read out the image processing-related data such as image processing information of the frame to be reprinted. Then, the parameter integration subsection 76 displays the result of retrieval on the display 20 as well as supplies the necessary information to a predetermined site such as the setup subsection 70.

The recording means 78 for recording the image processing-related data such as image processing information is not particularly limited; various means can be used.

For example, various mediums such as a hard disk, a database, a flexible disk, or a magneto-optical recording medium, which are built in or connected to the image processor 14, are given as examples of the recording means 78. Moreover, the print system 10 may be connected to an external database through communication means such as a computer communication network.

The image data processed in the prescan processing section 54 of the image processor 14 is sent to the display 20, while the image data processed in the fine scan processing section 56 is sent to the printer 16.

The printer 16 includes a printing unit for performing exposure on a photosensitive material in accordance with the supplied image data so as to record a latent image and a processor (developing unit) for performing predetermined processing on the exposed photosensitive material so as to output it as a print.

In the printer 16, for example, after a photosensitive material is cut at a length of a print, a back print is recorded thereon. Then, three kinds of light beams, that is, R exposure light, G exposure light and B exposure light, are modulated in accordance with the image data output from the image processor 14 so as to be deflected in a main scanning direction. At the same time, the photosensitive material is conveyed in an auxiliary scanning direction perpendicularly crossing the main scanning direction so as to be subjected to two-dimensional scanning exposure, thereby recording a latent image thereon. Then, the photosensitive material is supplied to the processor. The processor, which has received the photosensitive material, performs predetermined wet development processing such as color development, bleach-fix, wash and the like, and then, dries the developed photosensitive material to obtain prints. Then, the prints are sorted out into predetermined units such as one roll of film and the like so as to be accumulated.

Hereinafter, the functions of this embodiment will be described for both processing, i.e., in printing with film processing and reprinting, taking a 135-size film as an example.

In this embodiment, the production and storage of the data for retrieval, the image processing information, and the like will be mainly described in the case of printing with film processing, whereas the data retrieval related to processing of the image which is designated to be reprinted by using the data for retrieval will be mainly described in the case of reprinting. The description of usual image processing will be herein omitted.

First, in the case of printing with film processing, an operator attaches a carrier in conformity with the film F to the scanner 12 at a predetermined position so as to perform the prescan of the film F. When the prescan data is read, the setup subsection 70 performs the production of a density histogram, the calculation of the image characteristic quantity and the like from the prescan data so as to calculate the reading conditions for fine scan or the image processing condition. The parameter integration subsection 76 sets the image processing condition for each predetermined site.

Based on the thus set image processing condition, predetermined image processing is performed in the prescan processing section 54 so as to display an image for verification on the display 20 (verification monitor).

The operator sees a verification screen on the display 20 so as to perform the confirmation (verification) of the image. The operator adjusts (corrects) a color, a density, a gradation and the like by using the adjustment key set on the keyboard 18a and the like as the needs arises. A signal for adjustment is sent to the key correction subsection 74. The key correction subsection 74 calculates the amount of correction of the image processing condition in accordance with the input and sends the calculated amount of correction to the parameter integration subsection 76. The parameter integration subsection 76 corrects the image processing condition set at the processing subsections 62 and 66 in accordance with the transmitted amount of correction. Accordingly, the image displayed on the display 20 is varied in accordance with the input by the operator.

Exposure condition recording data is produced from the image processing condition which is finally determined in the above-described process.

On the other hand, a frame number is read from the film F in parallel with the above-described processing. The image processing condition and the like for the image of each frame are managed by the frame number of each frame. The parameter integration subsection 76 produces the image processing-related data such as image processing information so as to correspond to each frame number and sends them to the recording means 78. The image processing-related data such as image processing information are recorded and stored in the recording means 78 as a database.

As information necessary for reprocessing including the image processing-related data such as image processing information, for example, the data for retrieval and the image processing information such as image processing condition, and in some cases additionally, the compressed image data, the image information, or the like are included. It is effective to use the image characteristic quantity data, which is fetched out upon production of the compressed image data, as the data for retrieval. Preferably, the image processing-related data such as image processing information composed of the above-described data is related to at least one image information selected from among: frame number, film type, camera model, customer, image-specific ID, day, month and year of the acceptance of a print order, laboratory where a print order was accepted, machine, print order, film format (ASP, 135-size, Brownie-size, and the like), film carrier type, film mask, day, month, year and time of day of photographing, image format (BMP, JPEG and the like), and ordering terminal, and managed in the database.

The above-mentioned day, month, year and time of day of photographing may also be read from the image. Moreover, if the image processing-related data such as image processing information is related to various kinds of image information as much as possible as described above, the retrieval speed can be improved because such image information can be used as the data for retrieval or an auxiliary data thereof. At the same time, retrieval error can be reduced.

Furthermore, the image processing-related data such as image processing information includes information of registration date and time when it was registered in the database. As a result, the latest registered image data (information about the latest registered image data) can be specified.

When the image processing information (condition) is set as described above, the film is then subjected to fine scanning. Next, the film is subjected to the image processing under the above-described set image processing information (condition) in the fine scan processing section 56 as usual. Then, the printer 16 outputs a print (print made on the occasion of film processing) on which an image photographed on the film is reproduced.

As described above, in this embodiment, the image processing-related data such as image processing information is produced in printing with film processing so as to be recorded in the recording means 78. However, the timing of recording the image processing-related data such as image processing information in the recording means 78 is not limited thereto. For example, the image processing information and the like may alternatively be recorded in image processing, in the case where a customer is not satisfied with the image of a print made on the occasion of film processing and requests a reprint, specifying color/density processing and the like or in the case of print production of a frame whose information about the image processing is not recorded.

The compressed image data serves to display the result of retrieval on the display 20 in retrieval. If a display of the result of retrieval is not particularly needed, it is not necessary to record the compressed image data. Therefore, a memory capacity can be reduced by the amount of compressed image data. It is preferred to leave a choice to record the compressed image data or not. As the timing of selection, the selection may be made for each printing with film processing. However, the timing of selection is not limited thereto. For example, the selection may be made upon installation of a device so as to preset either the recording or the non-recording of the compressed image data.

Furthermore, when the image processing-related data such as image processing information is to be recorded, the number of frames as representing the amount of the image processing-related data such as image processing information which can be accumulated may be set or otherwise changed in accordance with the capability or the resource of the print system including mainly the capability of the CPU and the capacity of the hard disk. The number of frames may be set, for example, based on the available capacity of the hard disk or the like upon resource check during program installation.

In the case where the image characteristic quantity data is used as the data for retrieval, the image processing information (condition) and the image characteristic quantity data may be separately recorded, either of them being as the image processing-related data. Alternatively, the image characteristic quantity data may be related to the image processing information to be packed, so that the thus obtained set of data is recorded as the image processing-related data. The image processing information may be any information as long as it allows the reproduction of a print made on the occasion of film processing. It is further preferable that date and time, a customer number and the like are added to the image processing information.

The data for retrieval, the image processing information (condition) and the compressed image data, which constitute the image processing-related data such as image processing information, are related to each other. If these data are constituted so that the deletion of any one of the data allows deletion of the remaining data or so that the update of any one of the data allows update of the remaining data, it is possible to always record and manage only the necessary information. Therefore, a recording capacity is economized so as to allow efficient management of data. The update of the image processing-related data is carried out such that, if the image processing information (condition) in the image processing-related data read out during, for example, reprinting is not used as it is but the precedent processing condition is somewhat modified for improvement, the image processing-related data is recorded so updated as containing the latest information on the condition.

It is preferred to make a backup of the image processing-related data including the data for retrieval and the image processing information, and in some cases additionally, the compressed image data and the like at predetermined timing. Although this predetermined timing is not particularly limited, system startup time, inspection time at the start of operation, inspection time at the end of operation, system shut down time, system hang-up time, time when an operator gives an instruction, version-up time of software and the like are suitably given as examples of the timing.

Figure 3:
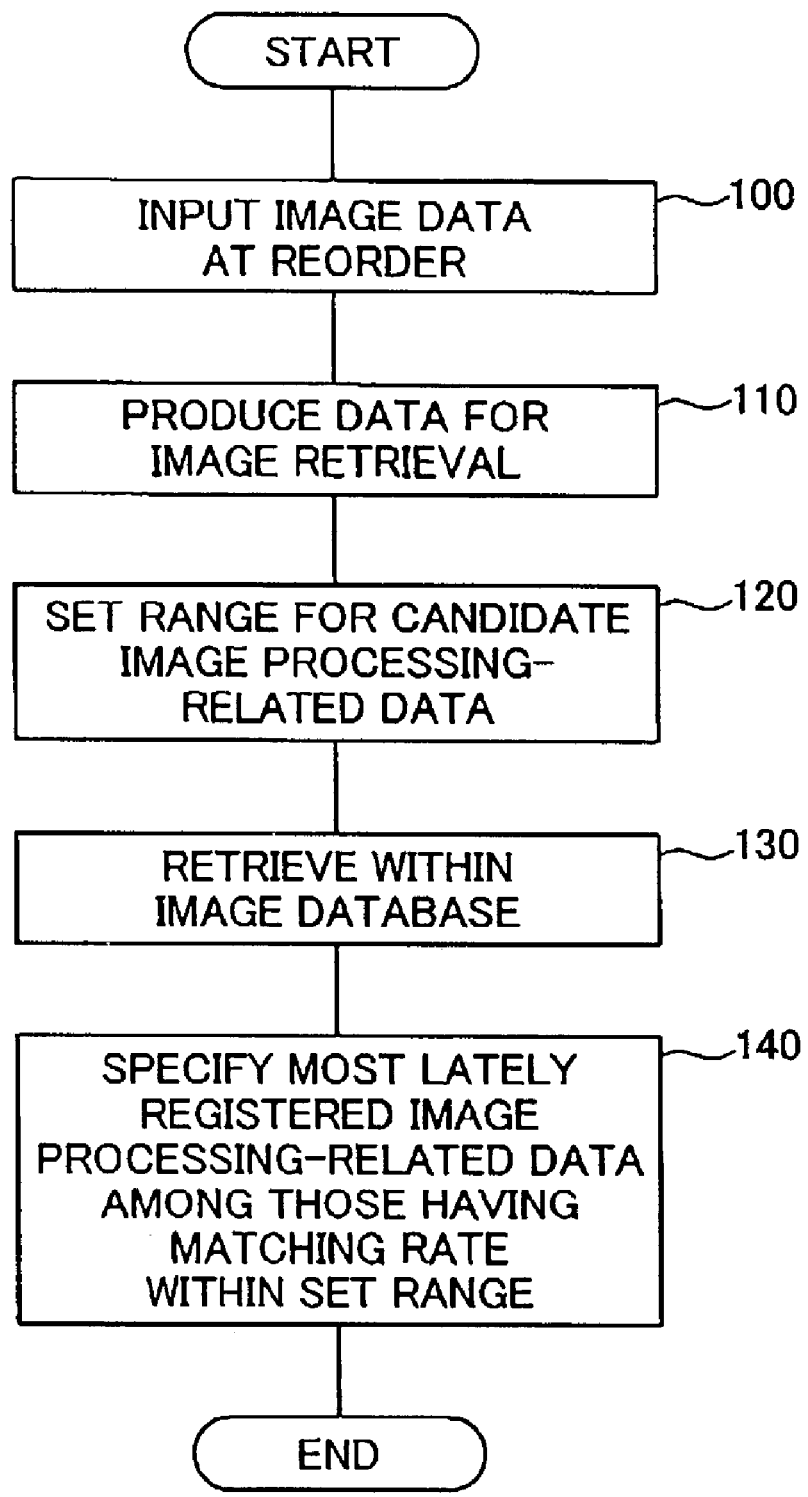
FIG. 3 is a flow chart showing a data retrieval method in an embodiment of the present invention.

Next, in the case of reprinting, in particular, a data retrieval method will be described in detail with reference to a flow chart of FIG. 3.

First, at step 100, image data at reorder is input. More specifically, the film F is prescanned by the scanner 12 so as to read an image which is requested to be reprinted. The read prescan data is transmitted to the image processor 14 along with the frame number.

Next, at step 110, the image characteristic quantity is calculated from the prescan data in the setup subsection 70 so as to produce the data for retrieval. At step 120, an operator sets the range for narrowing down candidate images (image processing-related data) through the operation system 18. This range is set, for example, so that the value of the image matching rate of each image (image processing-related data) may fall within a range (of a magnitude of α) predefined by the values equal to or less than the maximum value in the case where the retrieval is performed using the image characteristic quantity.

Next, at step 130, the parameter integration subsection 76 executes the retrieval within the database (recording means 78) by using the image characteristic quantity. More specifically, the image characteristic quantity of the reordered image is compared with that of each image within the database so as to calculate the image matching rate.

The retrieval within the database is executed in the order starting from the latest registered image (image processing-related data) to the earliest registered. The image characteristic quantity of the image to be retrieved (reordered image) and that of each image within the database are compared with each other to calculate the image matching rate.

Figure 4:
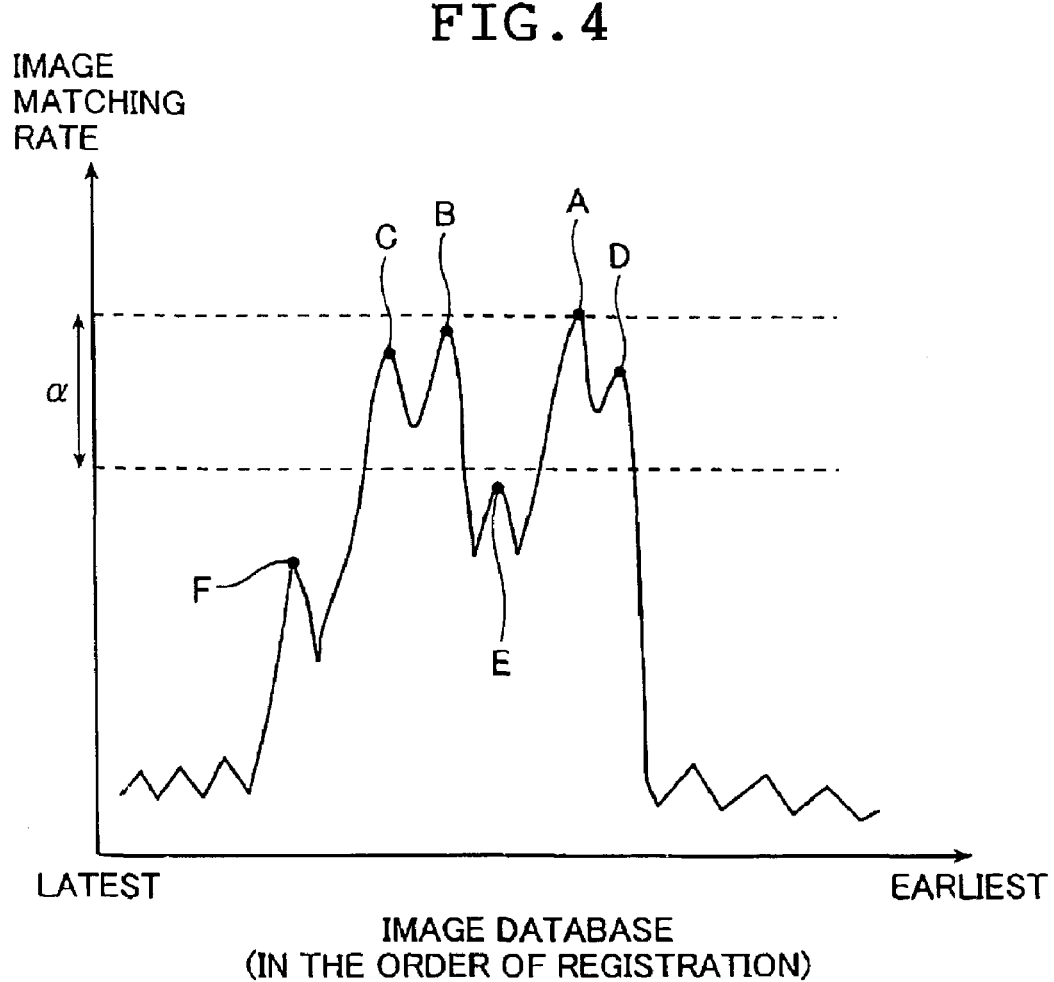
FIG. 4 is a diagram showing the relation between image data and an image matching rate, showing the result of data retrieval in this embodiment.
Figure 5:
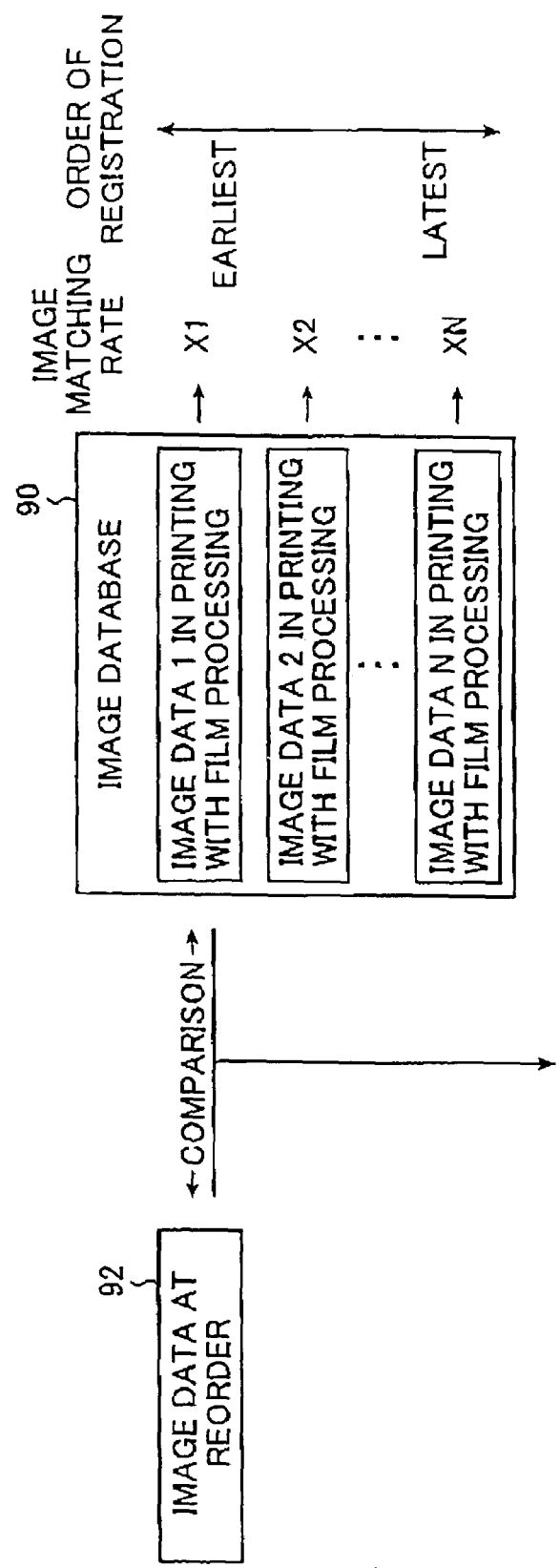
FIG. 5 is a schematic view showing a conventional method for retrieving data within an image database in accordance with a reordered image.

FIG. 4 shows the result of retrieval within the database. In FIG. 4, the abscissa axis indicates the images (image processing-related data) within the database arranged in the order of registration (from the latest registered to the earliest registered), whereas the ordinate axis indicates the image matching rate of each image. In FIG. 4, six images A to F each having a higher image matching rate are considered to be images close to the reordered image. More specifically, it is considered that these six images are the images reproduced in the printing with film processing that correspond to the reordered image (a plurality of images, which were printed while slightly changing the image processing and then registered) or the previously reordered images for which the contents of the image processing were modified and registered.

The relation of the values of the image matching rate of these six images is, as shown in FIG. 4, A>B>C>D>E>F. In this case, if a preset range is α, the images A, B, C and D each of which has an image matching rate of such a value as falling within the range of α defined by the values equal to or less than the value of the image A as the maximum value, can be candidate images for a moment. More specifically, the relations: A-α<B, A-α<C, and A-α<D are established for the images B, C and D, respectively. On the other hand, for the images E and F, the relations: E<A-α and F<A-α are established. As the values of the image matching rate of the images E and F being thus out of the above range, the images E and F can not be candidate images.

Although the image A having the maximum image matching rate is conventionally specified as a candidate image, a candidate image is specified in this embodiment in view of the order of registration of the images.

As shown in FIG. 4, the order of registration of the above-mentioned six images (image processing-related data) is D, A, E, B, C, F, starting from the earliest registered. Among those having an image matching rate of such a value as within the range of α defined by the values equal to or less than the value of the image A as the maximum value, the image C is the latest registered one. Therefore, in this embodiment, at step 140, the image C, which is the most lately registered among those having an image matching rate within the predetermined range, is specified as a candidate image, because it is considered that the most lately registered image best meets the requests of a customer at present.

A compressed image or the like of the image specified as a result of retrieval is displayed on the display 20 so as to confirm the result of retrieval. Once the operator sees the displayed image as the result of retrieval and judges it as correct, the fine scanning is performed so as to obtain the image data for production of a reprint. The same image processing as that performed in the printing with film processing (when a print is produced from the image C) is performed on the obtained image data, using the image processing information or condition (exposure condition recording data) for the image C retrieved as described above. Then, processing through a 3D-LUT is mainly performed on the image data in accordance with the output form of print or image data and the processed image data is output.

As described above, according to this embodiment, the images having an image matching rate of a value falling within a certain range are regarded as the same image in consideration of variations of the input device and the like and among such images, the most lately registered is to be retrieved.

In this case, instead of setting a range as described above, the images having an image matching rate of a value higher than a predetermined value may be considered as a plurality of images reproduced in the printing with film processing and then registered so that the image (image processing-related data) registered latest among such images may always be retrieved.

Instead of simply retrieving the image having the maximum image matching rate as in a conventional method, the latest registered image (image processing-related data) is retrieved as described above, making it possible to meet the requests of a customer at each reorder.

For data retrieval, the present invention is applicable even to the case where the data retrieval is executed without using the image itself (the image characteristic quantity extracted from the image data). In the case of the APS film, for example, the retrieval can be performed by using FID and the frame number.

Although the data retrieval method of the present invention has been described above in detail, it is apparent that the present invention is not limited to the above-described embodiments and various modifications and changes may be possible as long as they do not depart from the scope of the present invention.

As described above, according to the present invention, the latest registered image (image processing-related data) within a certain range can be retrieved and a reprint can be produced in line with the requests of a customer even if the data (image processing-related data) that concern a plurality of image processing operations are registered in a database for one and the same image.

What is claimed is:

1. A data retrieval method for retrieving data necessary for image processing from a database, comprising:

relating image processing information used to perform an image processing operation on an image and data for retrieval used for specifying said image to each other;

registering the image processing information and the data for retrieval in advance in said database as image processing-related data concerning the image processing operation performed on said image every time one of a plurality of image processing operations is performed on said image;

performing retrieval within said database using said data for retrieval corresponding to the image on which reprocessing is to be performed; and specifying as candidate data for performing reprocessing on said image, the image processing-related data registered last among a plurality of image processing-related data concerning the image processing operations performed on said image that is registered in said database.

2. The data retrieval method according to claim 1, wherein at least one selected from among image information on said image subjected to image processing, image data on said image, and compressed image data on said image is additionally caused to correspond to said image processing information or said data for retrieval and recorded in said database.

3. The data retrieval method according to claim 1, wherein at least one selected from among an image characteristic quantity of said image, image information on said image subjected to image processing, and compressed image data on said image is used as said data for retrieval.

4. The data retrieval method according to claim 1, wherein an image characteristic quantity of said image is used as said data for retrieval.

5. The data retrieval method according to claim 1, wherein said image is photoelectrically read from an image photographed on a film.

6. The data retrieval method according to claim 1, wherein said plurality of image processing operations are performed during printing with film processing.

7. A data retrieval method for retrieving data necessary for image processing from a database, comprising:
relating image processing information used to perform an image processing operation on an image and data for retrieval used for specifying said image to each other;
registering the image processing information and the data for retrieval in advance in said database as image processing-related data concerning the image processing operation performed on said image every time one of a plurality of the image processing operations is performed on said image;
performing retrieval within said database using said data for retrieval corresponding to the image on which reprocessing is to be performed; and
specifying as candidate data for performing reprocessing on said image, the image processing-related data registered last among a plurality of image processing-related data concerning the image processing operations performed on said image that is registered in said database, with each of said image processing-related data having such a matching rate with said data for retrieval that its value is within a predetermined range from a maximum value to a given value.

8. The data retrieval method according to claim 7, wherein at least one selected from among image information on said image subjected to image processing, image data on said image, and compressed image data on said image is additionally caused to correspond to said image processing information or said data for retrieval and recorded in said database.

9. The data retrieval method according to claim 7, wherein at least one selected from among an image characteristic quantity of said image, image information on said image subjected to image processing, and compressed image data on said image is used as said data for retrieval.

10. The data retrieval method according to claim 7, wherein an image characteristic quantity of said image is used as said data for retrieval.

11. The data retrieval method according to claim 7, wherein said image is photoelectrically read from an image photographed on a film.

12. The data retrieval method according to claim 7, wherein said plurality of image processing operations are performed during printing with film processing.

* * * * *